(12) United States Patent
Kwon et al.

(10) Patent No.: US 10,359,672 B2
(45) Date of Patent: Jul. 23, 2019

(54) DISPLAY DEVICE AND MANUFACTURING METHOD THEREOF

(71) Applicant: Samsung Display Co., Ltd., Yongin-si, Gyeonggi-do (KR)

(72) Inventors: Seonggyu Kwon, Suwon-si (KR); Sangil Kim, Yongin-si (KR); Wontae Kim, Suwon-si (KR); Haksun Kim, Seoul (KR); Namseok Roh, Seongnam-si (KR); Jaecheol Park, Hwaseong-si (KR); Youyoung Jin, Suwon-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 15/824,812

(22) Filed: Nov. 28, 2017

(65) Prior Publication Data

US 2018/0157077 A1    Jun. 7, 2018

(30) Foreign Application Priority Data

Dec. 5, 2016   (KR) .................. 10-2016-0164524

(51) Int. Cl.
*G02F 1/1343*    (2006.01)
*G02F 1/1335*    (2006.01)

(52) U.S. Cl.
CPC ...... *G02F 1/1343* (2013.01); *G02F 1/133514* (2013.01); *G02F 1/133528* (2013.01); *G02F 1/133617* (2013.01)

(58) Field of Classification Search
None
See application file for complete search history.

(56) References Cited

U.S. PATENT DOCUMENTS

| 2007/0172969 A1* | 7/2007 | Wong ..................... B41M 3/003 438/22 |
| 2008/0252824 A1* | 10/2008 | Kadowaki ............ G02B 5/3016 349/96 |
| 2009/0109386 A1* | 4/2009 | Chen ................. G02F 1/133707 349/123 |
| 2015/0004333 A1* | 1/2015 | Kim ......................... C08B 3/14 428/1.1 |
| 2016/0131809 A1* | 5/2016 | Takeda ................. G02B 5/3016 349/194 |
| 2016/0216557 A1 | 7/2016 | Rho et al. |
| 2017/0269435 A1* | 9/2017 | Yoon ................. G02F 1/133617 |
| 2018/0088369 A1* | 3/2018 | Kim ................. G02F 1/133509 |
| 2018/0107028 A1* | 4/2018 | Jung .................... G02F 1/0063 |

FOREIGN PATENT DOCUMENTS

| KR | 2014-0010635 | 1/2014 |
| KR | 2014-0074495 | 6/2014 |
| KR | 2016-0086739 | 7/2016 |

\* cited by examiner

*Primary Examiner* — Phu Vu
(74) *Attorney, Agent, or Firm* — Innovation Counsel LLP

(57) ABSTRACT

A display device includes: a first substrate; a first electrode disposed on the first substrate; a liquid crystal layer disposed on the first electrode; a polarizing plate disposed on the liquid crystal layer; a color conversion layer disposed on the polarizing plate and including a plurality of color conversion portions; and a second substrate disposed on the color conversion layer. The polarizing plate includes a polymer film, and a distance between the liquid crystal layer and the color conversion layer is in a range of about 5 μm to about 50 μm.

22 Claims, 10 Drawing Sheets

DISPLAY DEVICE AND MANUFACTURING METHOD THEREOF

CROSS-REFERENCE TO RELATED APPLICATION

This application claims priority under 35 U.S.C. § 119 to Korean Patent Application No. 10-2016-0164524, filed on Dec. 5, 2016, in the Korean Intellectual Property Office (KIPO), the disclosure of which is incorporated by reference herein in its entirety.

1. TECHNICAL FIELD

Exemplary embodiments relate to a display device and a method of manufacturing the display device, and more particularly, to a display device including a color conversion layer and a method of manufacturing the display device.

2. DISCUSSION OF RELATED ART

Liquid crystal display ("LCD") devices are one of most widely used types of flat panel display ("FPD") devices. An LCD device includes two substrates including electrodes formed thereon and a liquid crystal layer interposed therebetween.

Upon applying voltage to the two electrodes, liquid crystal molecules of the liquid crystal layer are rearranged such that an amount of transmitted light is controlled in the LCD device. Such an LCD device includes a color filter for expressing color.

In recent times, display devices in which a color filter used in a conventional LCD device is replaced with fluorescent elements have been studied. A display device including such a color conversion layer including fluorescent elements is referred to as a photoluminescent display ("PLD") device. The PLD device includes a polarizing plate between a color conversion layer and a liquid crystal layer.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY

Exemplary embodiments may be directed to a display device having excellent color expression capability.

According to an exemplary embodiment, a display device includes: a first substrate; a first electrode disposed on the first substrate; a liquid crystal layer disposed on the first electrode; a polarizing plate disposed on the liquid crystal layer; a color conversion layer disposed on the polarizing plate and including a plurality of color conversion portions; and a second substrate disposed on the color conversion layer. The polarizing plate includes a polymer film, and a distance between the liquid crystal layer and the color conversion layer is in a range of about 5 μm to about 50 μm.

The distance between the liquid crystal layer and the color conversion layer may be in a range of about 5 μm to about 20 μm.

The polarizing plate may be a linear polarizer including polyvinyl alcohol (PVA).

The display device may further include a second electrode between the polarizing plate and the liquid crystal layer.

The second electrode may contact the liquid crystal layer.

The polarizing plate may have a thickness in a range of about 3 μm to about 10 μm.

The display device may further include an adhesive layer between the polarizing plate and the color conversion layer.

The display device may further include a retardation plate between the polarizing plate and the liquid crystal layer.

The retardation plate may include at least one of a quarter wave plate and a half wave plate.

The color conversion layer may include a phosphor.

The phosphor may include quantum dots.

The color conversion layer may include: a red conversion portion configured to absorb a blue light and emit a red light; and a green conversion portion configured to absorb a blue light and emit a green light.

The color conversion layer may further include a transmission portion that is configured to transmit a blue light.

The display device may further include a yellow color filter between the red conversion portion and the second substrate and between the green conversion portion and the second substrate.

The display device may further include a dichroic reflection layer between the polarizing plate and the color conversion layer.

The display device may further include a light blocking layer among the plurality of color conversion portions.

The light blocking layer may have a height less than a height of the color conversion portion with respect to a surface of the second substrate.

The light blocking layer may cover at least a part of a surface of the color conversion portion in a direction of the liquid crystal layer.

According to another exemplary embodiment, a method of manufacturing a display device includes: forming a first electrode on a first substrate; forming, on a second substrate, a color conversion layer including a plurality of color conversion portions; attaching a polarizing plate having a film shape on the color conversion layer; and disposing a liquid crystal layer between the first substrate and the second substrate. The first electrode and the polarizing plate are disposed to oppose each other, and a distance between the liquid crystal layer and the color conversion layer is in a range of about 5 μm to about 50 μm.

The polarizing plate may be a linear polarizer including polyvinyl alcohol (PVA).

The polarizing plate may have a thickness in a range of about 3 μm to about 10 μm.

The method may further include forming a second electrode on the polarizing plate, after attaching the polarizing plate.

The second electrode may be formed by depositing a transparent conductive material on a surface of the polarizing plate.

The forming of the color conversion layer may include: forming, on the second substrate, a light blocking layer that defines an opening; and disposing the plurality of color conversion portions at the opening.

The forming of the color conversion layer may include: forming, on the second substrate, a plurality of color conversion portions spaced apart from each other; and forming a light blocking layer among the plurality of color conversion portions spaced apart from each other.

The foregoing is illustrative only and is not intended to be in any way limiting. In addition to the illustrative aspects, exemplary embodiments, and features described above, further aspects, exemplary embodiments, and features will become apparent by reference to the drawings and the following detailed description.

BRIEF DESCRIPTION OF THE DRAWINGS

A more complete appreciation of the inventive concept will become more apparent by describing in detail exemplary embodiments thereof with reference to the accompanying drawings, wherein.

DETAILED DESCRIPTION

Figure 1:
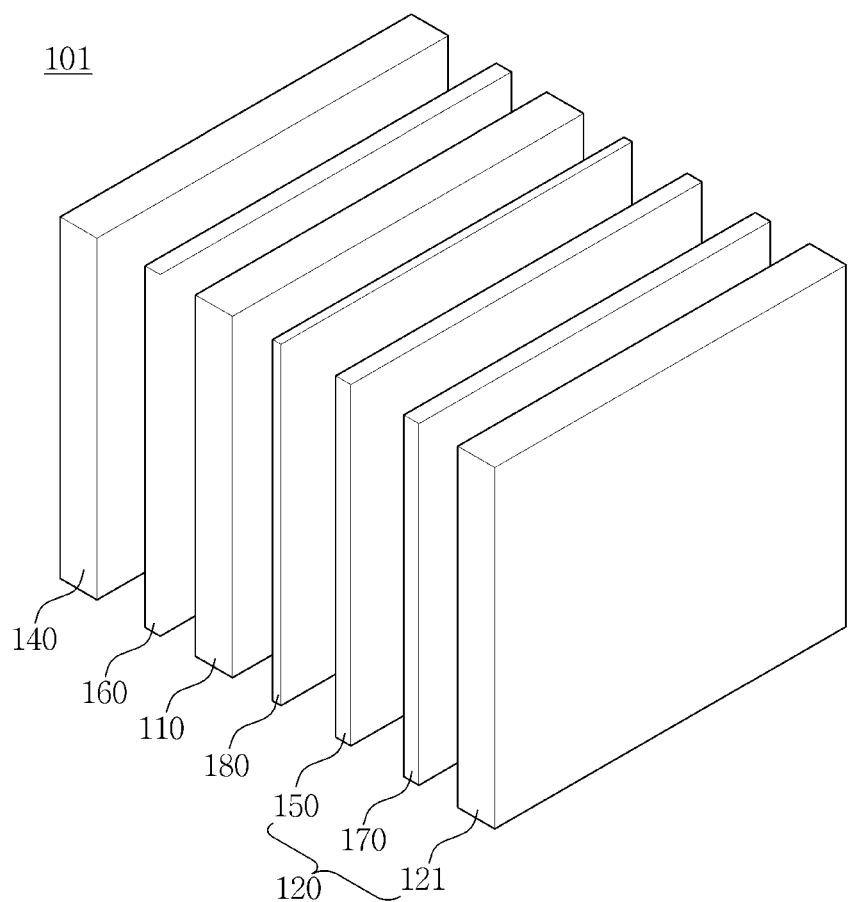
FIG. 1 is an exploded perspective view illustrating a display device according to an exemplary embodiment.

Exemplary embodiments will now be described more fully hereinafter with reference to the accompanying drawings. Although the inventive concept may be modified in various manners and have several exemplary embodiments, exemplary embodiments are illustrated in the accompanying drawings and will be mainly described in the specification. However, the scope of the inventive concept is not limited to the exemplary embodiments and should be construed as including all the changes, equivalents, and substitutions included in the spirit and scope of the inventive concept.

In the drawings, thicknesses of a plurality of layers and areas are illustrated in an enlarged manner for clarity and ease of description thereof. When a layer, area, or plate is referred to as being "on" another layer, area, or plate, it may be directly on the other layer, area, or plate, or intervening layers, areas, or plates may be present therebetween. Conversely, when a layer, area, or plate is referred to as being "directly on" another layer, area, or plate, intervening layers, areas, or plates may be absent therebetween. Further when a layer, area, or plate is referred to as being "below" another layer, area, or plate, it may be directly below the other layer, area, or plate, or intervening layers, areas, or plates may be present therebetween. Conversely, when a layer, area, or plate is referred to as being "directly below" another layer, area, or plate, intervening layers, areas, or plates may be absent therebetween.

The spatially relative terms "below", "beneath", "less", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms used herein (including technical and scientific terms) have the same meaning as commonly understood by those skilled in the art to which this disclosure pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Some of the parts which are not associated with the description may not be provided in order to specifically describe exemplary embodiments, and like reference numerals refer to like elements throughout the specification.

Hereinafter, an exemplary embodiment will be described with reference to FIGS. 1, 2, 3 and 4.

FIG. 1 is an exploded perspective view illustrating a display device 101 according to an exemplary embodiment.

Referring to FIG. 1, the display device 101 according to an exemplary embodiment includes a backlight unit 140, a polarizing member 160, a display substrate 110, a liquid crystal layer 180, and an opposing substrate 120 that are sequentially stacked. The opposing substrate 120 includes a polarizing plate 150, a color conversion layer 170 and a second substrate 121. The polarizing member 160 between the backlight unit 140 and the display substrate 110 also includes a polarizing plate.

The backlight unit 140 may emit ultraviolet (UV) rays, near UV rays, or the like. The backlight unit 140 may irradiate, for example, white light or blue light to the display substrate 110. Hereinafter, exemplary embodiments will be described with respect to a display device including a backlight unit 140 that emits blue light.

Figure 2:
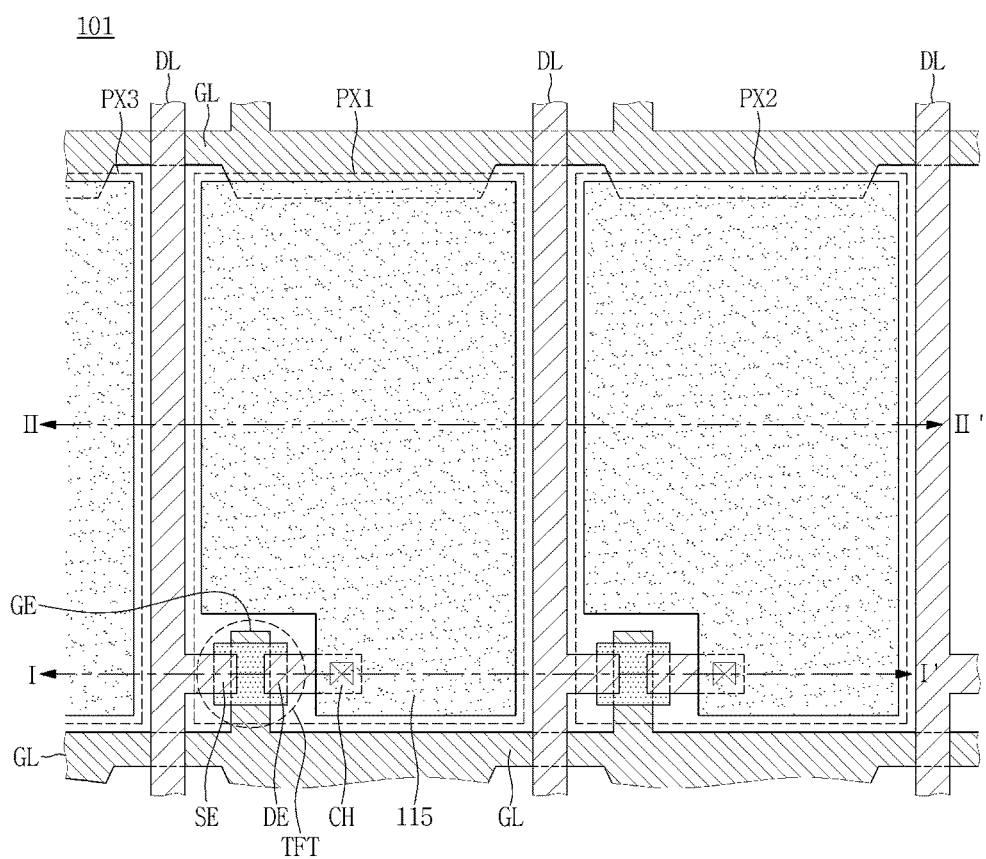
FIG. 2 is a plan view illustrating a pixel of the display device illustrated in FIG. 1.
Figure 3:
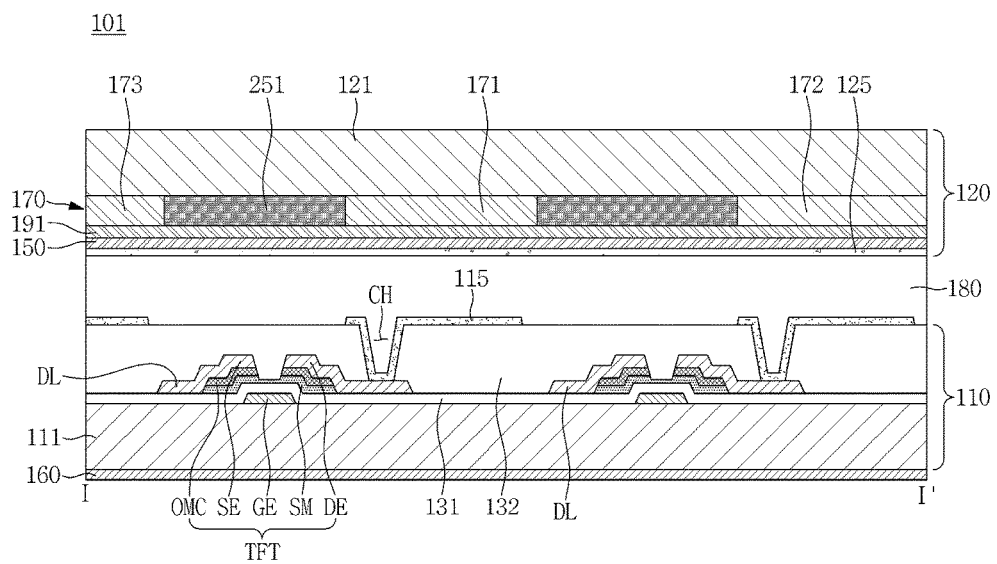
FIG. 3 is a cross-sectional view taken along line I-I' of FIG. 2.
Figure 4:
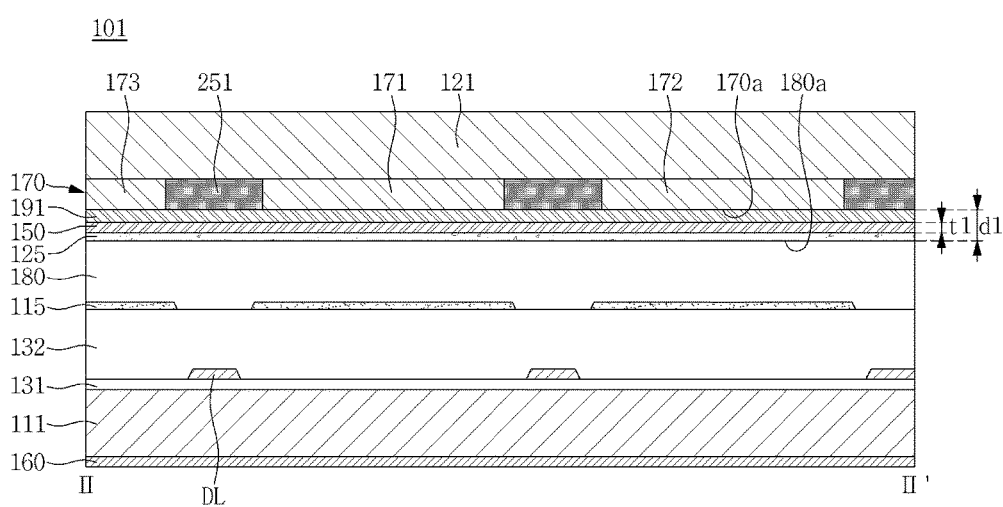
FIG. 4 is a cross-sectional view taken along line II-II' of FIG. 2.

FIG. 2 is a plan view illustrating a pixel of the display device illustrated in FIG. 1, FIG. 3 is a cross-sectional view taken along line I-I' of FIG. 2, and FIG. 4 is a cross-sectional view taken along line II-II' of FIG. 2.

As illustrated in FIGS. 2 and 3, the display device 101 according to an exemplary embodiment includes the liquid crystal layer 180 between the display substrate 110 and the opposing substrate 120. Accordingly, the display device 101 according to an exemplary embodiment may be referred to as a liquid crystal display ("LCD") device. An amount of light transmitted from the backlight portion 140, sometimes called the backlight unit 140, to the color conversion layer 170 is controlled by the liquid crystal layer 180.

The display substrate 110 includes a first substrate 111, a thin film transistor TFT, a first electrode 115, a gate insulating layer 131, and a protective layer 132. The thin film transistor TFT includes a semiconductor layer SM, an ohmic contact layer OMC, a gate electrode GE, a source electrode SE and a drain electrode DE.

In addition, the polarizing member 160 is disposed on the display substrate 110. For example, the polarizing member 160 may be disposed on a back surface of the first substrate 111. The polarizing member 160 includes a linear polarizer. The polarizing member 160 may further include a retardation plate.

The first substrate 111 may include transparent materials such as glass or plastic.

A plurality of gate lines GL and the gate electrode GE are disposed on the first substrate 111. The gate line GL is connected to the gate electrode GE. The gate line GL and the gate electrode GE may include or be formed of one of: aluminum (Al) or alloys thereof, silver (Ag) or alloys thereof, copper (Cu) or alloys thereof, molybdenum (Mo) or alloys thereof, chromium (Cr), tantalum (Ta), and/or titanium (Ti). At least one of the gate line GL and the gate electrode GE may have a multilayer structure including at least two conductive layers that have different physical properties.

The gate insulating layer 131 is disposed over an entire surface of the first substrate 111 including the gate line GL and the gate electrode GE. The gate insulating layer 131 may include silicon nitride ($SiN_x$) or silicon oxide ($SiO_x$). In addition, the gate insulating layer 131 may have a multilayer structure including at least two insulating layers having different physical properties.

The semiconductor layer SM is disposed on the gate insulating layer 131. In such an exemplary embodiment, the semiconductor layer SM overlaps the gate electrode GE below the gate insulating layer 131. The semiconductor layer SM may include amorphous silicon, polycrystalline silicon, or the like. The semiconductor layer SM may include an oxide semiconductor.

The ohmic contact layer OMC may be disposed on the semiconductor layer SM. For example, the ohmic contact layer OMC is disposed on the semiconductor layer SM other than a channel area.

In addition, a plurality of data lines DL are disposed on the gate insulating layer 131. The data line DL intersects the gate line GL. The source electrode SE is connected to the data line DL. The source electrode SE is disposed on the ohmic contact layer OMC. The drain electrode DE, spaced apart from the source electrode SE, is disposed on the ohmic contact layer OMC and is connected to the first electrode 115.

At least one of the data line DL, the source electrode SE and the drain electrode DE may include or be formed of a refractory metal, such as molybdenum, chromium, tantalum, and titanium, or an alloy thereof. Further, at least one of the data line DL, the source electrode SE and the drain electrode DE may have a multilayer structure including a refractory metal layer and a low-resistance conductive layer.

The protective layer 132 is disposed over an entire surface of the first substrate 111 including the semiconductor layer SM, the data line DL, the source electrode SE and the drain electrode DE. The protective layer 132 may include an inorganic insulating material such as silicon nitride (SiNx) and silicon oxide (SiOx). In an alternative embodiment, the protective layer 132 may include an organic layer. In another embodiment, the protective layer 132 may have a double-layer structure including a lower inorganic layer and an upper organic layer.

The first electrode 115 is disposed on the protective layer 132. The first electrode 115 is connected to the drain electrode DE through a contact hole CH defined in the protective layer 132. The first electrode 115 may include a transparent conductive material such as indium tin oxide (ITO) and indium zinc oxide (IZO). According to an exemplary embodiment, the first electrode 115 is a pixel electrode.

The liquid crystal layer 180 is disposed on the first electrode 115. According to an exemplary embodiment, the liquid crystal layer 180 includes self-aligned liquid crystals. The self-aligned liquid crystals may be arranged without an alignment layer. When the self-aligned liquid crystal is used, the alignment layer may not be disposed on the first electrode 115 and a second electrode 125.

The opposing substrate 120 is disposed on the liquid crystal layer 180.

The opposing substrate 120 includes the second substrate 121, the color conversion layer 170 and the polarizing plate 150. The polarizing plate 150 is disposed more adjacent to the liquid crystal layer 180 than the color conversion layer 170 is thereto. Referring to FIGS. 3 and 4, the polarizing plate 150 is disposed on the liquid crystal layer 180, the color conversion layer 170 is disposed on the polarizing plate 150, and the second substrate 121 is disposed on the color conversion layer 170. On the other hand, with respect to the second substrate 121, the color conversion layer 170 is disposed on the second substrate 121, and the polarizing plate 150 is disposed on the color conversion layer 170.

In addition, the opposing substrate 120 may further include a light blocking layer 251 and the second electrode 125. Each of the light blocking layer 251 and the second electrode 125 may be disposed on the display substrate 110.

The second substrate 121 may include transparent materials such as glass or plastic.

According to an exemplary embodiment, the light blocking layer 251 is disposed on the second substrate 121. The light blocking layer 251 defines a plurality of openings. On a plane, the light blocking layer 251 may have a mesh shape or a matrix shape having a plurality of openings. Accordingly, the light blocking layer 251 is also referred to as a black matrix (BM).

The openings defined by the light blocking layer 251 are located corresponding to respective first electrodes 115 of first, second and third pixels PX1, PX2 and PX3. The light blocking layer 251 blocks light at portions other than the openings. For example, the light blocking layer 251 is disposed on the thin film transistor TFT, the gate line GL and the data line DL to block light from passing therethrough and being directed to the outside. The light blocking layer 251 is not invariably necessary, and may be omitted.

The color conversion layer 170 converts the wavelength of a light incident from the backlight unit 140 to emit a light having a different wavelength. According to an exemplary embodiment, the color conversion layer 170 includes a phosphor (i.e., a fluorescent material).

Referring to FIGS. 3 and 4, the color conversion layer 170 includes a plurality of color conversion portions 171 and 172. The color conversion portions 171 and 172 include a phosphor that absorbs light having a predetermined wavelength and emits light having a different wavelength. The color conversion portions 171 and 172 may be disposed in openings defined by the light blocking layer 251. That is, the light blocking layer 251 may be disposed between the color conversion portions 171 and 172 that are adjacent to each other.

According to an exemplary embodiment, the color conversion layer 170 includes the first color conversion portion 171 and the second color conversion portion 172. For example, the first color conversion portion 171 is a red conversion portion corresponding to the red pixel PX1, and emits red light. The second color conversion portion 172 is a green conversion portion corresponding to the green pixel PX2, and emits green light.

The first color conversion portion 171 includes a red phosphor and the second color conversion portion 172 includes a green phosphor. According to an exemplary embodiment, the red phosphor absorbs blue light to emit red light, and the green phosphor absorbs blue light to emit green light.

Referring to FIGS. 3 and 4, the color conversion layer 170 includes a transmission portion 173. A wavelength of a light passing through the transmission portion 173 does not change. The transmission portion 173 according to an exemplary embodiment transmits blue light. Accordingly, when the backlight unit 140 emits blue light, the transmission portion 173 may correspond to the blue pixel PX3.

Although not illustrated, the color conversion layer 170 may further include a third color conversion portion that absorbs blue light and emits light other than red and green.

The color conversion portions 171 and 172 may include a resin including a phosphor. A phosphor is a substance that fluoresces when irradiated with light or radiation, and emits light having a specific wavelength of a phosphor. Further, the phosphor emits light to the entire region irrespective of the direction of the irradiated light. According to an exemplary embodiment, a quantum dot may be used as the phosphor. In addition, a quantum rod may be used as the phosphor.

Of the two, the quantum dots absorb light incident to the quantum dot, and then emit light having a wavelength different from a wavelength of the incident light. That is, the quantum dot is a wavelength converting particle that may convert the wavelength of the light incident to the quantum dot. A wavelength range that a quantum dot may convert may vary depending on the size of the quantum dot. For example, by adjusting a diameter of the quantum dot, the quantum dot may emit a light of a desired color.

The quantum dot generally has a high extinction coefficient and a high quantum yield, thus emitting significantly intense fluorescence. In particular, the quantum dot may absorb a light of a relatively short wavelength and then emit a light of a longer wavelength.

The quantum dot may have a structure including a core and a shell surrounding the core. The shell may have two or more layers. In addition, the quantum dot may further include an organic ligand bound to the shell and may include an organic coating layer surrounding the shell.

The quantum dot may include at least one substance of group II compound semiconductors, group III compound semiconductors, group V compound semiconductors, and group VI compound semiconductors. For example, the core forming the quantum dot may include at least one of: PbSe, InAs, PbS, CdSe, InGaP, CdTe, CdS, ZnSe, ZnTe, ZnS, HgTe, and/or HgS. Further, the shell may include at least one of: CuZnS, CdSe, CdTe, CdS, ZnSe, ZnTe, ZnS, HgTe, and/or HgS.

Even quantum dots of a substantially same composition may produce different light depending on their diameters.

Further, the color conversion layer 170 may further include a reflective element. An example of the reflective element may include $TiO_2$. The reflective element may have a particle shape and may be dispersed in a resin including a phosphor.

Referring to FIGS. 3 and 4, with respect to the second substrate 121, the polarizing plate 150 is disposed on the color conversion layer 170 and the second electrode 125 is disposed on the polarizing plate 150.

In addition, an overcoat layer 191 may be disposed between the color conversion layer 170 and the polarizing plate 150. The overcoat layer 191 serves to protect the color conversion layer 170 and to flatten an upper portion of the color conversion layer 170 in the direction of the polarizing plate 150. The overcoat layer 191 may include a light transmissive organic material. According to an exemplary embodiment, an adhesive layer may be used as the overcoat layer 191. That is, an adhesive layer may be disposed between the color conversion layer 170 and the polarizing plate 150. The adhesive layer used as the overcoat layer 191 functions to flatten an upper portion of the color conversion layer 170 and to attach the polarizing plate 150 to the color conversion layer 170. The overcoat layer 191 may be omitted.

According to an exemplary embodiment, the second electrode 125 is disposed between the polarizing plate 150 and the liquid crystal layer 180. The second electrode 125 may be disposed over an entire surface of the second substrate 121 including the polarizing plate 150. The second electrode 125 may include a transparent conductive material such as ITO or IZO. According to an exemplary embodiment, the second electrode 125 is a common electrode.

The second electrode 125 may be formed by deposition. For example, a transparent conductive material may be directly deposited on one side of the polarizing plate 150 to form the second electrode 125. In such an exemplary embodiment, room temperature deposition may be performed. In such an exemplary embodiment, the second electrode 125 may be formed directly on a surface of the polarizing plate 150 without thermal deformation of the polarizing plate 150.

The second electrode 125 applies an electric field to the liquid crystal layer 180 together with the first electrodes 115.

The polarizing plate 150 is disposed between the second electrode 125 and the color conversion layer 170.

The polarizing plate 150 according to an exemplary embodiment includes a polymer film and linearly polarizes incident light. The polarizing plate 150 may include a linear polarizer including a polymer film. That is, the polarizing plate 150 may use a linear polarizer including polyvinyl alcohol (PVA).

As a more detailed example, the polarizing plate 150 may use a film that is formed by orienting dichroic dyes on a PVA resin in an absorption manner. Examples of polyvinyl alcohol (PVA) resins include a homopolymer of vinyl acetate or a copolymer of vinyl acetate and other monomers.

The polarizing plate 150 may be formed by, for example, uniaxially stretching a PVA resin film, dyeing the PVA resin film with a dichroic dye for the dichroic dye to be absorbed to the PVA resin film in an absorption manner, treating the PVA resin film adsorbed with the dichroic dye using an aqueous solution, and washing. However, the method of manufacturing the polarizing plate 150 is not limited thereto.

A transmission axis of the polarizing plate 150 may be arranged to be orthogonal to a transmission axis of the polarizing member 160 on the display substrate 110. Either the transmission axis of the polarizing plate 150 or the transmission axis of the polarizing member 160 may be arranged in parallel to the gate line GL.

In general, an alignment layer is used to align liquid crystal molecules included in the liquid crystal layer 180. The alignment layer may be disposed on a surface of the first electrode 115 and a surface of the second electrode 125. The alignment layer may include a compound such as polyimide (PI), and in such an exemplary embodiment, heat treatment is performed to fix alignment of polyimide (PI). The polarizing plate 150 including a polymer film may be deformed by the heat generated in the heat treatment process. When a polymer film, such as PVA, forming the polarizing plate 150 is deformed by such heat, the polarization efficiency of the polarizing plate 150 is lowered or the polarizing plate 150 may lose polarizing function. Accordingly, when the alignment layer is disposed on the second electrode 125, in order to substantially prevent deformation of the polarizing plate 150 due to heat generated in the alignment layer formation process, an additional protective member or a support member is disposed between the second electrode 125 and the polarizing plates 150. When such a protective member or support member is used, the thickness of the optical layer becomes thick, and a distance dl between the liquid crystal layer 180 and the color conversion layer 170 becomes large. When the distance dl between the liquid crystal layer 180 and the color conversion layer 170 increases, the possibility of color mixture and parallax is increased. In the case where the distance dl between the liquid crystal layer 180 and the color conversion layer 170 is large, a light having passed through the liquid crystal layer 180 of one pixel (for example, one pixel PX1) may affect the color conversion portion 172 disposed in another pixel (for example, another pixel PX2). As such, in the case where the light of one pixel PX1 affects another pixel PX2, parallax may be generated.

According to an exemplary embodiment, the alignment layer is not disposed on the second electrode 125. That is, the second electrode 125 directly contacts the liquid crystal layer 180.

As described above, according to an exemplary embodiment, since the alignment layer is absent on the second electrode 125, the heat treatment process for forming the alignment layer is omitted, and a protective member or a support member may not be additionally provided to prevent deformation of the polarization plate 150 between the second electrode 125 and the polarizing plate 150. Accordingly, the polarizing plate 150 may include only a linear polarizer including a polymer film. Accordingly, the distance dl between the liquid crystal layer 180 and the color conversion layer 170 is short, and the occurrence of color mixture and parallax may be substantially prevented.

In addition, according to an exemplary embodiment, the polarizing plate 150 has a small thickness t1. Accordingly, the distance dl between the liquid crystal layer 180 and the color conversion layer 170 may be further reduced. For example, the polarizing plate 150 may have a thickness ranging from about 3 μm to about 10 μm. As a more detailed example, the polarizing plate 150 may have a thickness ranging from about 5 μm to about 8 μm.

According to an exemplary embodiment, the distance dl between the liquid crystal layer 180 and the color conversion layer 170 is in a range of about 5 μm to about 50 μm. Referring to FIG. 4, the distance t1 between the liquid crystal layer 180 and the color conversion layer 170 is defined as a distance between an upper surface 180a of the liquid crystal layer 180 and a lower surface 170a of the color conversion layer 170.

As a more detailed example, the distance dl between the liquid crystal layer 180 and the color conversion layer 170 may be in a range of about 5 μm to about 30 μm. For example, the distance dl between the liquid crystal layer 180 and the color conversion layer 170 may be adjusted within a range of about 5 μm to about 20 μm.

According to an exemplary embodiment, the distance dl between the liquid crystal layer 180 and the color conversion layer 170 is significantly short. Accordingly, a light controlled by one pixel PX1 does not affect another pixel PX2, such that the occurrence of parallax may be substantially prevented.

Figure 5:
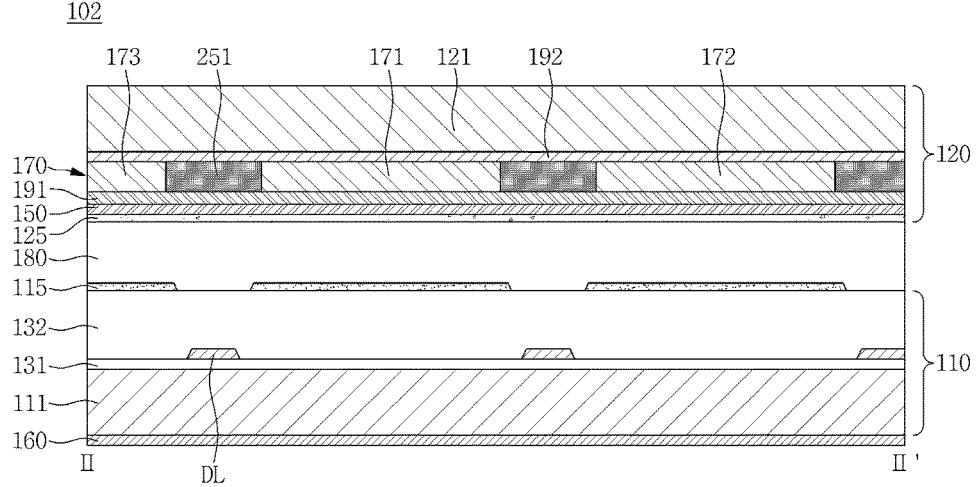
FIG. 5 is a cross-sectional view illustrating a display device according to an alternative exemplary embodiment.

FIG. 5 is a cross-sectional view illustrating a display device 102 according to an alternative exemplary embodiment.

The display device 102 according to an alternative exemplary embodiment includes a passivation layer 192 between a second substrate 121 and a color conversion layer 170. The passivation layer 192 substantially prevents impurities or unnecessary components from penetrating into the color conversion layer 170, and also serves to flatten a surface of the second substrate 121. The passivation layer 192 may include one or more layers selected from various inorganic films and organic films.

Figure 6:
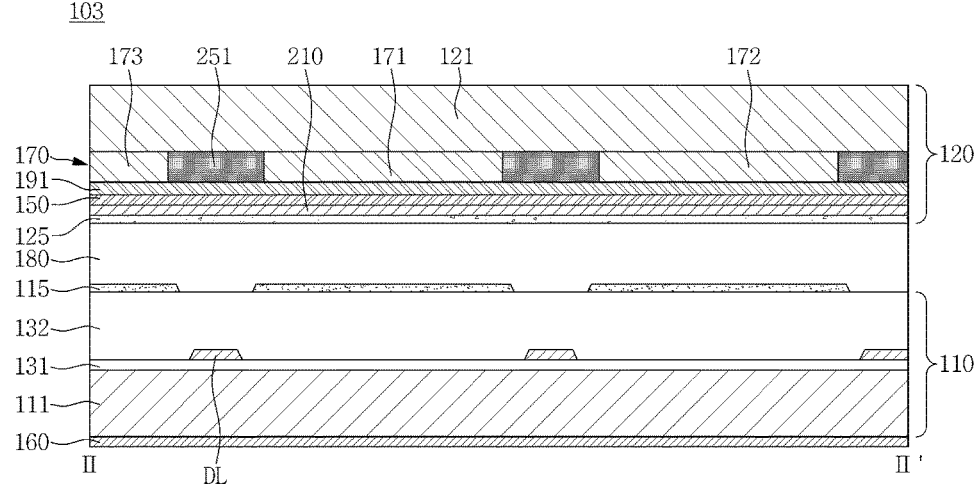
FIG. 6 is a cross-sectional view illustrating a display device according to another alternative exemplary embodiment.

FIG. 6 is a cross-sectional view illustrating a display device 103 according to another alternative exemplary embodiment.

The display device 103 according to according to another alternative exemplary embodiment includes a retardation plate 210 between a polarizing plate 150 and a liquid crystal layer 180. Referring to FIG. 6, the retardation plate 210 is disposed between the polarizing plate 150 and a second electrode 125.

The retardation plate 210 is disposed on one surface of the polarizing plate 150 to retard a phase of a light. The retardation plate 210 may convert linearly polarized light into circularly polarized light, or may convert circularly polarized light into linearly polarized light. For example, the circularly polarized light having passed through the liquid crystal layer 180 may be linearly polarized by the retardation plate 210. An amount of light passing through the polarizing plate 150 changes depending on the degree of polarization of light passing through the liquid crystal layer 180.

At least one of a quarter wave plate (QWP) and a half wave plate (HWP) may be used as the retardation plate 210.

According to another alternative exemplary embodiment, the retardation plate 210 in the form of a film may be used. For example, the retardation plate 210 may be manufactured by stretching a film, or may include a photo-curable liquid crystal compound. The retardation plate 210 may be attached to the polarizing plate 150. For attachment, an adhesive layer may be disposed between the retardation plate 210 and the polarizing plate 150.

Figure 7:
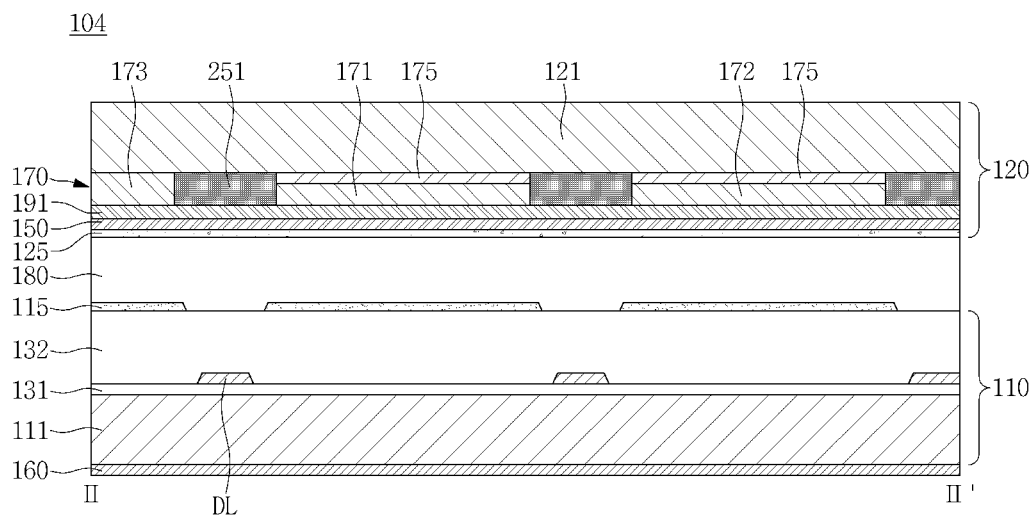
FIG. 7 is a cross-sectional view illustrating a display device according to still another alternative exemplary embodiment.

FIG. 7 is a cross-sectional view illustrating a display device 104 according to still another alternative exemplary embodiment.

The display device 104 of FIG. 7 includes a yellow color filter 175. Referring to FIG. 7, the yellow color filter 175 is disposed between a second substrate 121 and a first color conversion portion 171 which is a red conversion portion and between the second substrate 121 and a second color conversion portion 172 which is a green conversion portion.

The yellow color filter 175 absorbs blue light and transmits red light and green light. According to still another alternative exemplary embodiment, blue light emitted from a backlight unit 140 is incident to the color conversion layer 170. Of the blue light incident to the first color conversion portion 171, a light converted into a red light is transmitted through the yellow color filter 175 and a blue light not converted into the red light is absorbed by the yellow color filter 175. In addition, of the blue light incident to the second color conversion portion 172, a light converted into a green light is transmitted through the yellow color filter 175 and a blue light not converted into the green light is absorbed by the yellow color filter 175. Accordingly, clear red and green are realized in the red and green pixels respectively corresponding to the first color conversion portion 171 and the second color conversion portion 172, and the display quality of the display device 104 is improved.

Figure 8:
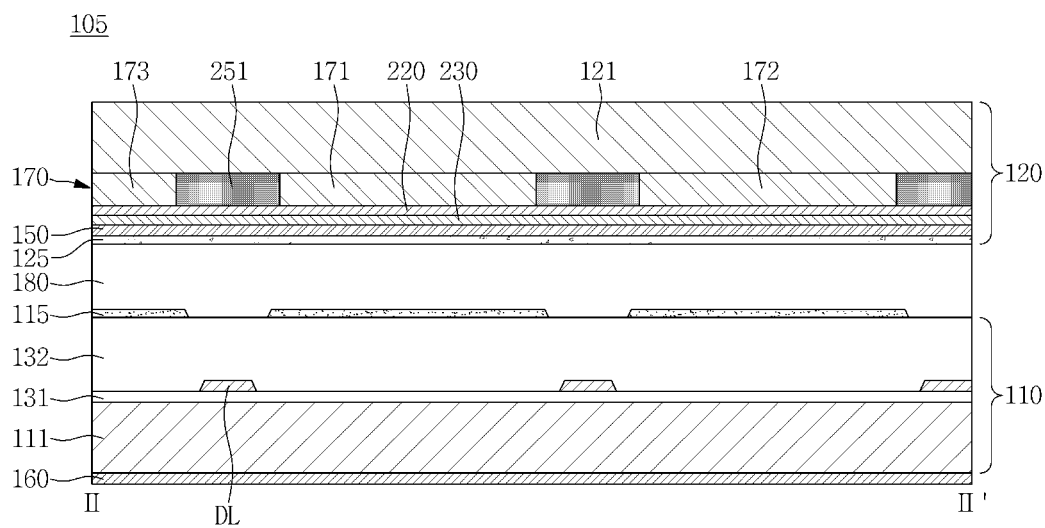
FIG. 8 is a cross-sectional view illustrating a display device according to yet another alternative exemplary embodiment.

FIG. 8 is a cross-sectional view illustrating a display device 105 according to yet another alternative exemplary embodiment.

The display device 105 illustrated in FIG. 8 includes a dichroic reflection layer 220 between a color conversion layer 170 and a polarizing plate 150.

The dichroic reflection layer 220 is also referred to as a dichroic filter. The dichroic reflection layer 220 transmits a light having a predetermined wavelength among incident light and reflects a light having a wavelength other than the predetermined wavelength.

In the case where a light incident from the backlight unit 140 is blue light, a dichroic reflection layer 220 that transmits blue light and reflects light other than blue light may be used. In such an exemplary embodiment, the light incident from the backlight unit 140 passes through the dichroic reflection layer 220, while red and green lights converted by the color conversion layer 170 are reflected by the dichroic reflection layer 220.

As red and green lights are reflected by the dichroic reflection layer 220, the red light and the green light generated in the color conversion layer 170 and emitted toward the liquid crystal layer 180 are reflected toward the second substrate 121 by the dichroic reflection layer 220 to be emitted to the outside. Accordingly, luminous efficiency of the display device 105 may be improved. Since the red light and the green light are reflected, the dichroic reflection layer 220 is also referred to as a yellow reflection filter (YRF).

The dichroic reflection layer 220 includes a plurality of high refractive index layers and a plurality of low refractive index layers which are alternately stacked. Selective light transmission may be achieved in the dichroic reflection layer 220 by a multilayer film interference phenomenon caused by the plurality of high refractive index layers and the plurality of low refractive index layers. The low refractive index layer may include at least one of $MgF_2$ and $SiO_2$, and the high refractive index layer may include at least one of Ag, $TiO_2$, $Ti_2O_3$, and $Ta_2O_3$, but exemplary embodiments are not limited thereto.

In addition, referring to FIG. 8, an adhesive layer 230 is disposed between the dichroic reflection layer 220 and the polarizing plate 150. The polarizing plate 150 is attached to the dichroic reflection layer 220 by the adhesive layer 230.

Figure 9:
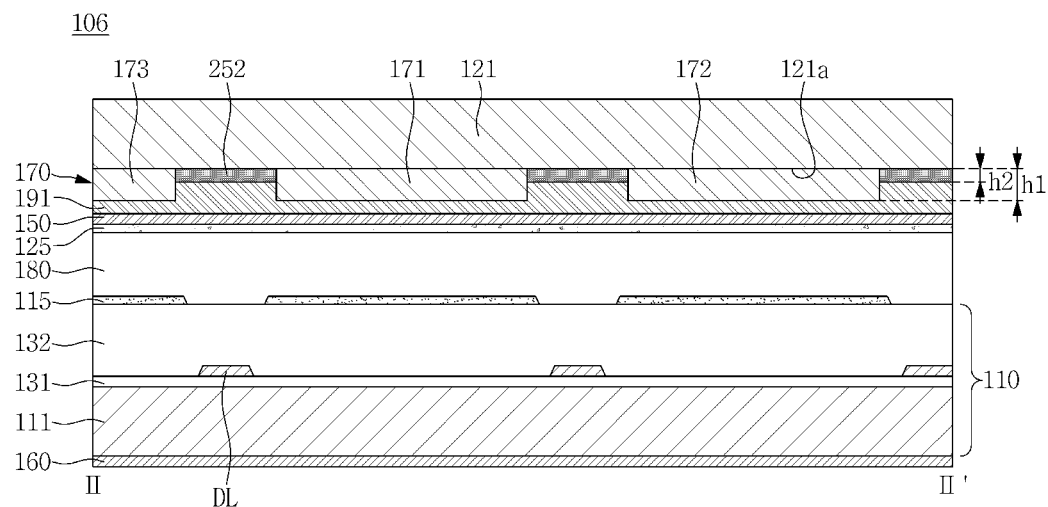
FIG. 9 is a cross-sectional view illustrating a display device according to still yet another alternative exemplary embodiment.

FIG. 9 is a cross-sectional view illustrating a display device 106 according to still yet another alternative exemplary embodiment.

Referring to FIG. 9, a light blocking layer 252 has a height h2 that is less than a height h1 of color conversion portions 171 and 172 with respect to a surface 121a of a second substrate 121. The light blocking layer 252 serves to divide each region of a color conversion layer 170, that is, the first color conversion portion 171, the second color conversion portion 172 and a transmission portion 173.

As the height h2 of the light blocking layer 252 is less than the height h1 of the color conversion portions 171 and 172 constituting the color conversion layer 170, there is a step difference between the light blocking layer 252 and the color conversion layer 170. Referring to FIG. 9, an overcoat layer 191 is filled in the stepped space so that a lower portion of the color conversion layer 170 on the side of the polarizing plate 150 is flattened. As a more detailed example, the overcoat layer 191 is disposed to overlap the light blocking layer 252 between the color conversion portions 171 and 172 adjacent to each other and between the color conversion portions 171 and 172 and the transmission unit 173, and thus the lower portion of the color conversion layer 170 is flattened.

Figure 10:
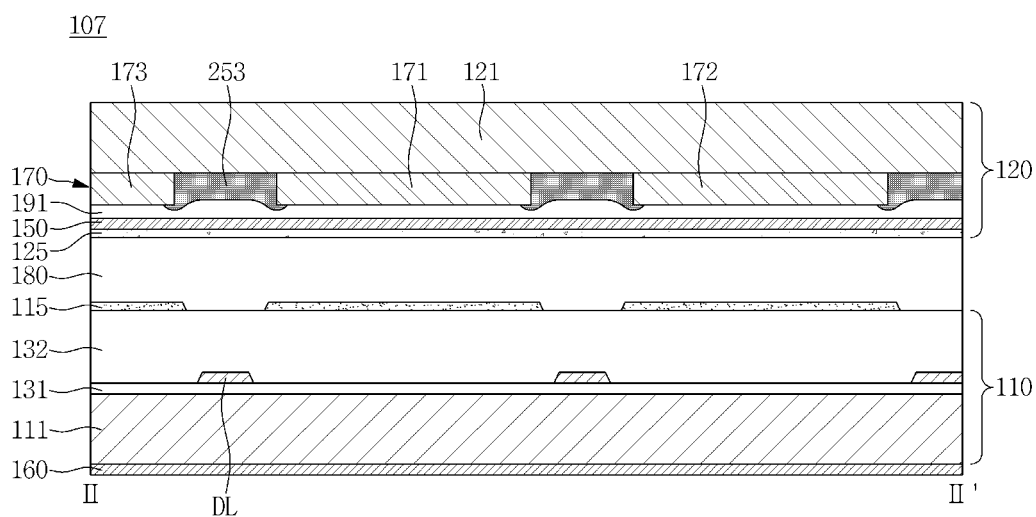
FIG. 10 is a cross-sectional view illustrating a display device according to still yet another alternative exemplary embodiment.

FIG. 10 is a cross-sectional view illustrating a display device 107 according to still yet another alternative exemplary embodiment.

Referring to FIG. 10, a light blocking layer 253 covers at least a portion of surfaces of color conversion portions 171 and 172 in the direction of a liquid crystal layer 180. In addition, the light blocking layer 253 covers at least a portion of a surface of a transmission portion 173 in the direction of the liquid crystal layer 180.

As such, as the light blocking layer 253 covers a part of the surfaces of the color conversion portions 171 and 172 and the transmission portion 173, and particularly an edge thereof, a light having passed through the liquid crystal layer 180 corresponding to one pixel (for example, one pixel PX1) is substantially prevented from affecting a color conversion portion of another pixel (for example, another pixel PX2). Accordingly, the color mixture and the parallax may be substantially prevented in the display device 107.

Hereinafter, a method of manufacturing the display device 101 according to an exemplary embodiment will be described with reference to FIGS. 11A, 11B, 11C, 11D, 11E, 11F and 11G.

FIGS. 11A, 11B, 11C, 11D, 11E, 11F and 11G are views illustrating a process of manufacturing the display device 101 according to an exemplary embodiment.

Figure 11A:
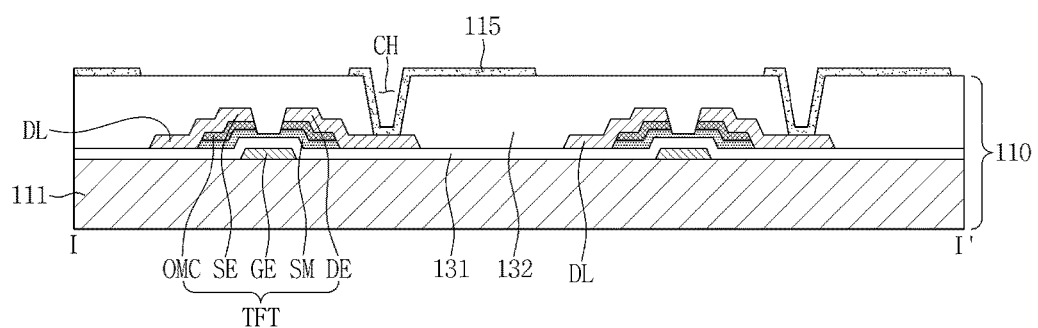
FIGS. 11A, 11B, 11C, 11D, 11E, 11F and 11G are views illustrating a process of manufacturing a display device according to an exemplary embodiment.

First, referring to FIG. 11A, a first electrode 115 is formed on a first substrate 111. As a more detailed example, a thin film transistor TFT is formed on the first substrate 111, and the first electrode 115 connected to the thin film transistor TFT is formed. In such an exemplary embodiment, the first electrode 115 is a pixel electrode.

Figure 11B:
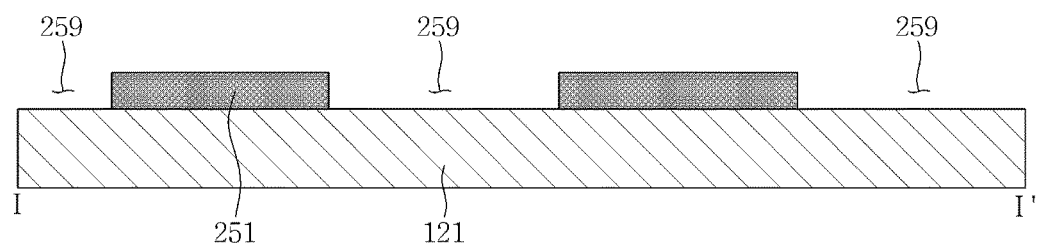

Subsequently, referring to FIG. 11B, a light blocking layer 251 is formed on a second substrate 121. A plurality of openings 259 are defined by the light blocking layer 251. The opening 259 is located corresponding to the first electrode 115.

Figure 11C:
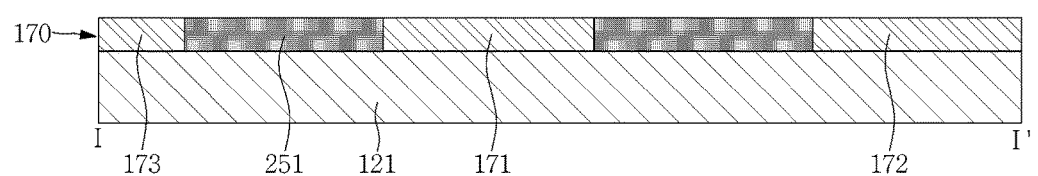

Referring to FIG. 11C, color conversion portions 171 and 172 are disposed at the opening 259 defined by the light blocking layer 251 to form a color conversion layer 170. As a more detailed example, a first color conversion portion 171, a second color conversion portion 172 and a transmission portion 173 are disposed at the opening 259 to form the color conversion layer 170.

Figure 11D:
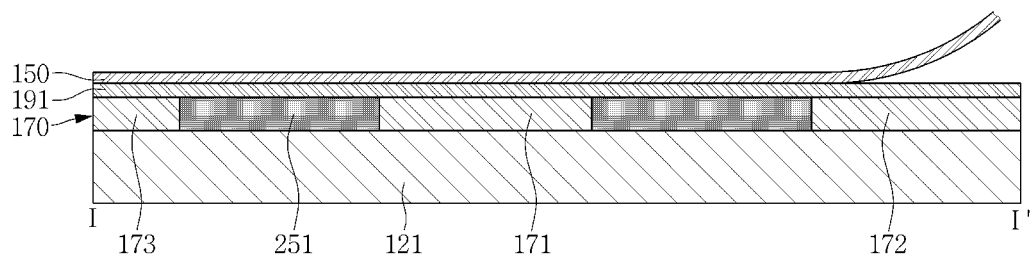

Referring to FIG. 11D, a polarizing plate 150 in the form of a film is attached on the color conversion layer 170. As a more detailed example, an overcoat layer 191 is formed on the color conversion layer 170, and the polarizing plate 150 is attached on the overcoat layer 191.

An upper portion of the color conversion layer 170 is flattened by the overcoat layer 191. For attachment of the polarizing plate 150, the overcoat layer 191 may have adhesiveness. Alternatively, one surface of the polarizing plate 150 attached to the overcoat layer 191 may have adhesiveness. For example, an adhesive layer may be disposed on one surface of the polarizing plate 150.

Figure 11E:
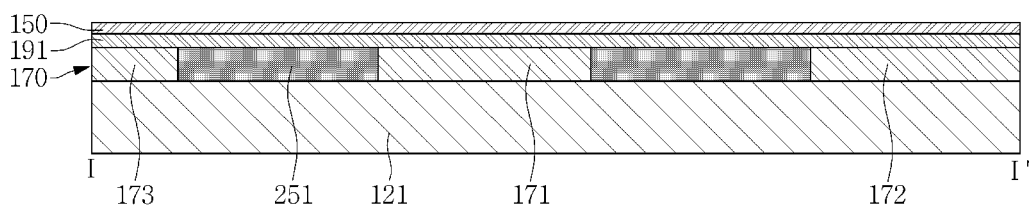

FIG. 11E illustrates a state in which the polarizing plate 150 is disposed on the overcoat layer 191 on the color conversion layer 170.

Figure 11F:
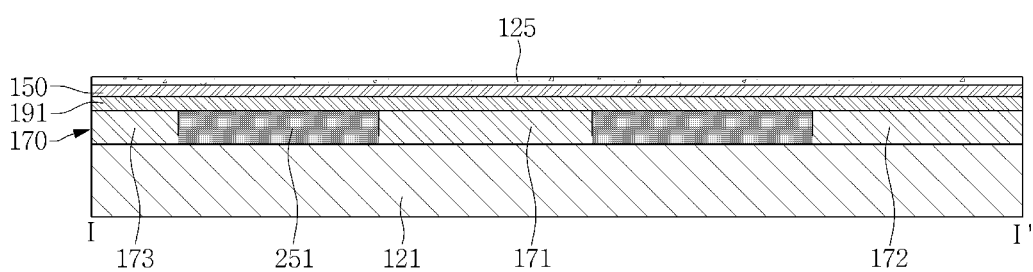

Referring to FIG. 11F, a second electrode 125 is formed on the polarizing plate 150.

For example, a transparent conductive material may be directly deposited on a surface of the polarizing plate 150 to form the second electrode 125. In such an exemplary embodiment, room temperature deposition may be performed.

Figure 11G:
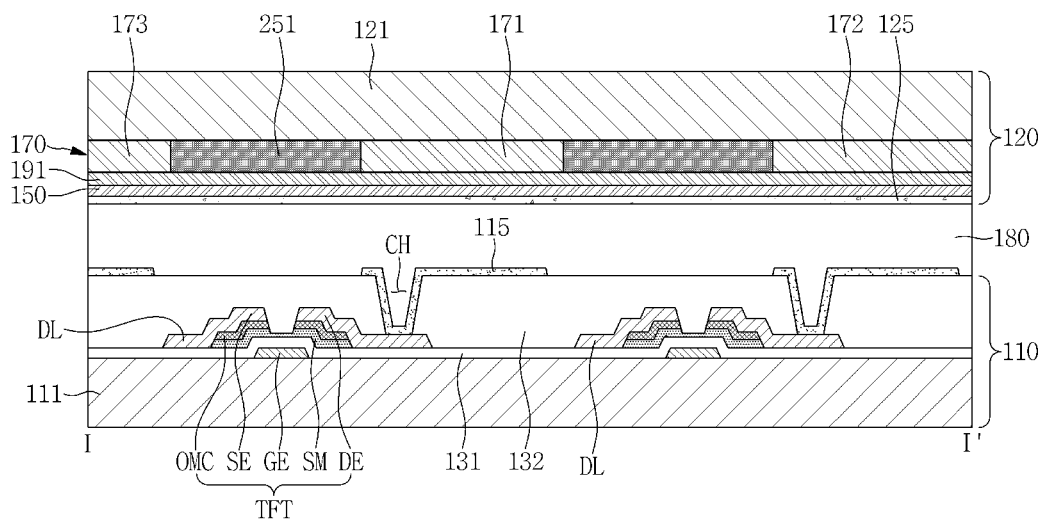

Referring to FIG. 11G, a liquid crystal layer 180 is interposed between the first substrate 111 and the second substrate 121. As a more detailed example, a display substrate 110 and an opposing substrate 120 are disposed so that the first electrode 115 and the second electrode 125 oppose each other, and the liquid crystal layer 180 is disposed between the display substrate 110 and the opposing substrate 120.

Subsequently, a polarizing member 160 is disposed on a back surface of the first substrate 111 such that the display device 101 is manufactured (see FIG. 3). The polarizing member 160 includes a linear polarizer, and may further include a retardation plate.

Figure 12A:
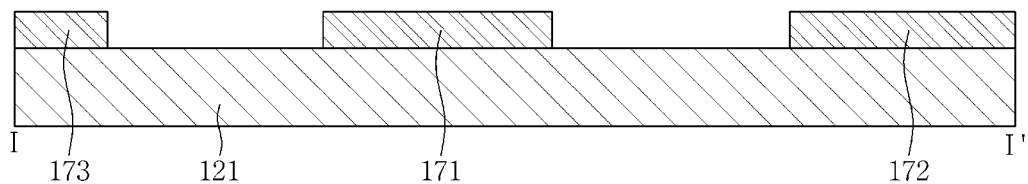
FIGS. 12A and 12B are views illustrating a process of manufacturing a display device according to an alternative exemplary embodiment.
Figure 12B:
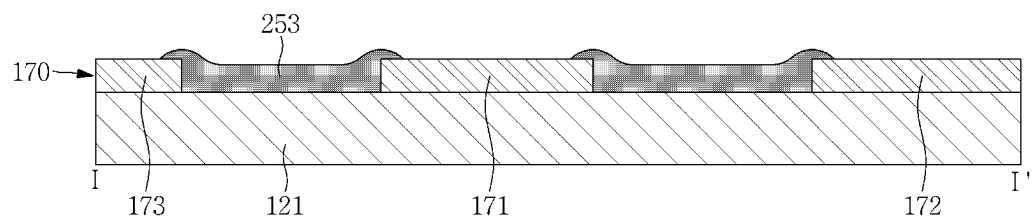

FIGS. 12A and 12B are views illustrating a process of manufacturing a display device according to an alternative exemplary embodiment. For example, FIGS. 12A and 12B illustrate a process of forming a color conversion layer 170 and a light blocking layer 253.

Referring to FIG. 12A, a plurality of color conversion portions 171 and 172 are formed on a second substrate 121. In such an exemplary embodiment, a transmission portion 173 is also formed.

Referring to FIG. 12B, the light blocking layer 253 is formed between the plurality of color conversion portions 171 and 172 spaced apart from each other. The light blocking layer 253 is also formed between the color conversion portions 171 and 172 and the transmission portion 173. The light blocking layer 253 is also disposed at a portion of an upper portion of the color conversion portions 171, 172 and the transmission portion 173. Accordingly, color mixture and parallax may be substantially prevented in the display device.

Figure 13:
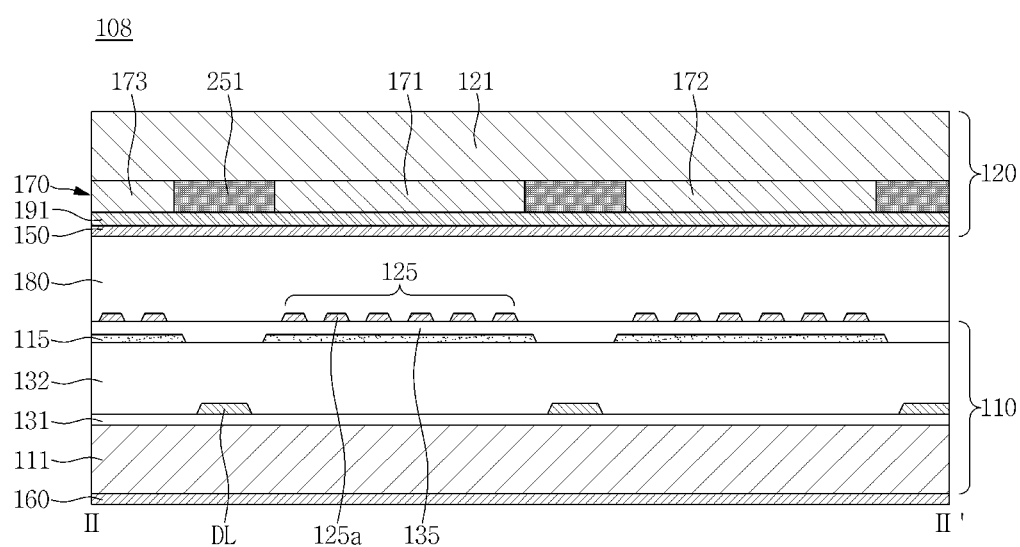
FIG. 13 is a cross-sectional view illustrating a display device according to still yet another alternative exemplary embodiment.

FIG. 13 is a cross-sectional view illustrating a display device 108 according to still yet another alternative exemplary embodiment.

Referring to FIG. 13, a display substrate 110 includes a first electrode 115 and a second electrode 125. That is, both of the first electrode 115 and the second electrode 125 are disposed on a first substrate 111.

According to still yet another alternative exemplary embodiment, the second electrode 125 includes a plurality of branch electrodes 125a, and the first electrode 115 and the second electrode 125 are spaced apart from each other, having an insulating layer 135 therebetween. However, still yet another exemplary embodiment is not limited to the structure illustrated in FIG. 13. Dissimilar to FIG. 13, the first electrode 115 may include a plurality of branch electrodes, and the positions of the first electrode 115 and the second electrode 125 may be reversed.

As set forth hereinabove, in the display device according to one or more exemplary embodiments, a distance between the liquid crystal layer and the color conversion layer is relatively short and thus the occurrence of parallax may be substantially prevented in the display device. Accordingly, the display device may have excellent color expression capability.

While the inventive concept has been illustrated and described with reference to the exemplary embodiments thereof, it will be apparent to those of ordinary skill in the art that various changes in form and detail may be made thereto without departing from the spirit and scope of the inventive concept.

What is claimed is:
1. A display device comprising:
   a first substrate;
   a first electrode disposed on the first substrate;
   a liquid crystal layer disposed on the first electrode;
   a polarizing plate disposed on the liquid crystal layer;
   a color conversion layer disposed on the polarizing plate and comprising a plurality of color conversion portions; and
   a second substrate disposed on the color conversion layer,
   a second electrode between the polarizing plate and the liquid crystal layer,
   wherein the polarizing plate comprises a polymer film, and the second electrode and the liquid crystal layer are in direct contact with each other to form a contact surface, and
   a distance between the liquid crystal layer and the contact surface is in a range of about 5 μm to about 50 μm.

2. The display device as claimed in claim 1, wherein the distance between the liquid crystal layer and the color conversion layer is in a range of about 5 μm to about 20 μm.

3. The display device as claimed in claim 1, wherein the polarizing plate is a linear polarizer comprising polyvinyl alcohol (PVA).

4. The display device as claimed in claim 1, wherein the polarizing plate has a thickness in a range of about 3 μm to about 10 μm.

5. The display device as claimed in claim 1, further comprising an adhesive layer between the polarizing plate and the color conversion layer.

6. The display device as claimed in claim 1, further comprising a retardation plate between the polarizing plate and the liquid crystal layer.

7. The display device as claimed in claim 6, wherein the retardation plate comprises at least one of a quarter wave plate and a half wave plate.

8. The display device as claimed in claim 1, wherein the color conversion layer comprises a phosphor.

9. The display device as claimed in claim 8, wherein the phosphor comprises quantum dots.

10. The display device as claimed in claim 1, wherein the color conversion layer comprises:
    a red conversion portion configured to absorb a blue light and emit a red light; and
    a green conversion portion configured to absorb a blue light and emit a green light.

11. The display device as claimed in claim 10, wherein the color conversion layer further comprises a transmission portion configured to transmit a blue light.

12. The display device as claimed in claim 10, further comprising a yellow color filter between the red conversion portion and the second substrate and between the green conversion portion and the second substrate.

13. The display device as claimed in claim 1, further comprising a dichroic reflection layer between the polarizing plate and the color conversion layer.

14. The display device as claimed in claim 1, further comprising a light blocking layer among the plurality of color conversion portions.

15. The display device as claimed in claim 14, wherein the light blocking layer has a height less than a height of the color conversion portion with respect to a surface of the second substrate.

16. The display device as claimed in claim 14, wherein the light blocking layer covers at least a part of a surface of the color conversion portion in a direction of the liquid crystal layer.

17. A method of manufacturing a display device, the method comprising:
    forming a first electrode on a first substrate;
    forming, on a second substrate, a color conversion layer comprising a plurality of color conversion portions;
    attaching a polarizing plate having a film shape on the color conversion layer;
    forming a second electrode on the polarizing plate; and
    disposing a liquid crystal layer between the first substrate and the second substrate,
    wherein the first electrode and the polarizing plate are disposed to oppose each other, and the second electrode and the liquid crystal layer are in direct contact with each other to form a contact surface,
    a distance between the liquid crystal layer and the contact surface is in a range of about 5 µm to about 50 µm.

18. The method as claimed in claim 17, wherein the polarizing plate is a linear polarizer comprising polyvinyl alcohol (PVA).

19. The method as claimed in claim 17, wherein the polarizing plate has a thickness in a range of about 3 µm to about 10 µm.

20. The method as claimed in claim 17, wherein the second electrode is formed by depositing a transparent conductive material on a surface of the polarizing plate.

21. The method as claimed in claim 17, wherein the forming of the color conversion layer comprises:
    forming, on the second substrate, a light blocking layer that defines an opening; and
    disposing the plurality of color conversion portions at the opening.

22. The method as claimed in claim 17, wherein the forming of the color conversion layer comprises:
    forming, on the second substrate, a plurality of color conversion portions spaced apart from each other; and
    forming a light blocking layer among the plurality of color conversion portions spaced apart from each other.

* * * * *